Patented Aug. 6, 1946

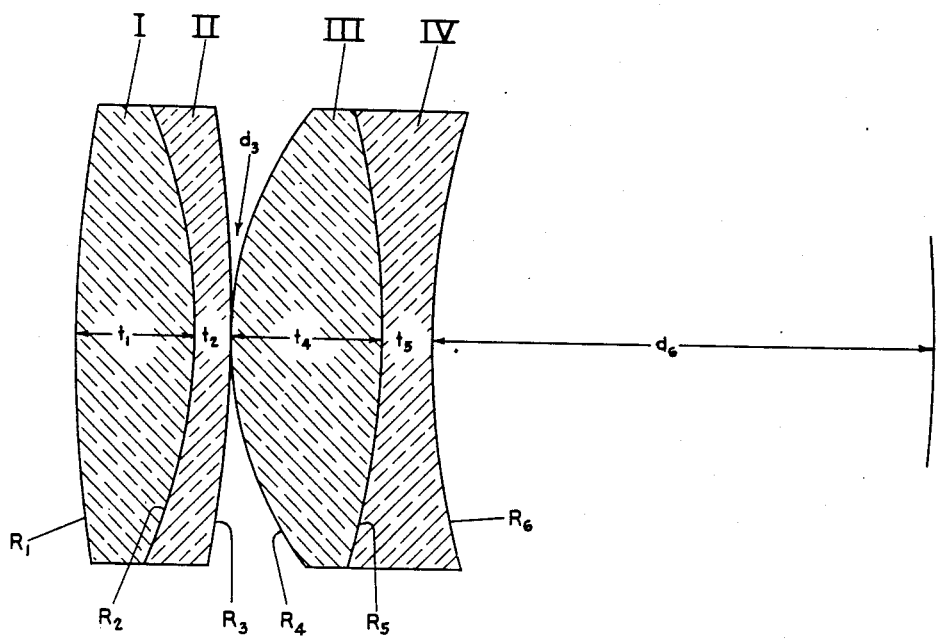

2,405,301

UNITED STATES PATENT OFFICE 2,405,301

OPTICAL SYSTEM

David S. Grey, Cambridge, Mass., assignor to Polaroid Corporation, Cambridge, Mass., a corporation of Delaware Application April 23, 1943, Serial No. 484,207

5 Claims. (Cl. 88—57)

This invention relates to lens systems and, more particularly, to an arrangement of lenses useful, for example, as a collimator.

It has been proposed to construct lens systems from components of synthetic resin but the indices of dispersion and refraction available in resins have rendered constructional data obtained in connection with lens systems of optical glasses substantially useless. This is especially true of a collimator system, particularly of the type having a large aperture and having the ratio of over-all length to lens diameter comparatively small. Accordingly, it is one object of the present invention to provide a collimator having these characteristics and formed from crown and flint materials having differences in indices of refraction and dispersion of the order obtainable in synthetic resins suitable for optical purposes.

Another object is to provide a novel collimator corrected for spherical aberration, coma, chromatic aberration and variation of spherical aberration with color to 30 seconds of arc.

Further objects are to provide a novel collimator wherein the above corrections are obtained at apertures as low as F/1.6, and wherein the tangential field is free from all aberrations except curvature, over a 12° total field within one minute of arc.

These and other objects and novel features of this invention will more fully appear from the following detailed description when the same is read in connection with the accompanying drawing. It is to be expressly understood, however, that the drawing is for the purpose of illustration only and is not intended as a definition of the limits of the invention, reference being primarily had for this latter purpose to the appended claims.

In the drawing there is shown a diagrammatic view of a lens system embodying one form of the invention, said view including the constructional data for said system.

In the form illustrated, the collimator of the present invention comprises a pair of doublets of substantially equal power in contact, or substantially so, and having their crown elements forward. The front doublet consists of a positive crown lens I and a negative flint lens II, and is approximately equi-convex. The rear doublet consists of a positive crown lens III and a negative flint lens IV, and is bent back until said flint lens is approximately equi-concave. All of the curvatures of the lens elements are as shallow as possible and the thicknesses are only great enough to provide the desired curvatures and lens aperture.

To obtain a minimum overall length for a corrected collimator having an aperture as low as F/1.6, flint and crown materials are used which have a large difference in dispersive indices, i. e., in nu values $$\frac{N_D - 1}{N_F - N_C}$$

as for example over 20, and a difference in indices of refraction between .06 and .10, with the flint of higher index of refraction. It will now be apparent that these requirements are satisfied by a resinous flint material, such as styrene, which has an index of refraction of approximately 1.591 and a nu value of approximately 31 and a resinous crown material, such as cyclohexyl methacrylate, which has an index of refraction of approximately 1.506 and a nu value of approximately 57. It is to be understood however, that the system comprehended by the invention may embody one or more lenses of optical glass provided the latter have optical indices which satisfy the above requirements.

The table below gives the constructional data for the lens system illustrated, by way of example, in the drawing.

The column "Radius" of the table refers to the radii of the spherical surfaces as measured in linear units, for example, millimeters. The column designated "Thickness" refers to the thickness of the lenses, also the air gaps between lenses, as measured on the axis of the lens system in the same linear units as those used to measure the "radius." The symbol "$t$" indicates lens thickness and "$d_3$" and "$d_6$" the distance separating the doublets and the distance between the rear surface of the lens system and the focal surface, respectively. The term "$N_D$" is used to designate the index of refraction of the materials for the lenses as measured for the yellow "D" line of a sodium arc. The column "V" designates the nu value or reciprocal dispersion for the lens materials used.

| Lens | Radius | Thickness | $N_D$ | V |
|---|---|---|---|---|
| I | $R_1 = +272.38$<br>$R_2 = -111.82$ | $t_1 = 23.89$ | 1.506 | 57 |
| II | $R_2 = -111.82$<br>$R_3 = -261.17$ | $t_2 = 7.28$<br>$d_3 = 0$ | 1.591 | 31 |
| III | $R_4 = +72.79$<br>$R_5 = -165.68$ | $t_4 = 30.07$ | 1.506 | 57 |
| IV | $R_5 = -165.68$<br>$R_6 = +160.32$ | $t_5 = 10.26$<br>$d_6 = 100.06$ | 1.591 | 31 |

The above collimator system has an aperture F/1.6 and is corrected for spherical aberration, coma, chromatic aberration, and variation of spherical aberration with color to 30 seconds of arc. The tangential field is free from all aberrations except curvature over a 12° total field within one minute of arc.

Since certain changes in the constructions set forth which embody the invention may be made without departing from its scope, it is intended that all matter contained in the foregoing description, or shown in the accompanying drawing, shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. As a new product, an F/1.6 collimator lens corrected for spherical aberration, coma, chromatic aberration and variation of spherical aberration with color to approximately thirty seconds of arc and comprising a pair of axially symmetrical doublets of substantially equal power substantially in contact, the foremost doublet consisting of a foremost positive lens of crown material having a focal length of from one to two times the focal length of the collimator and a negative lens of flint material having a focal length of from 1.5 to 3.5 times the focal length of the collimator, the second doublet consisting of a foremost positive lens of crown material having a focal length of from 0.5 to 1.2 times the focal length of the collimator and a negative lens of flint material having a focal length of from 0.75 to 1.5 times the focal length of the collimator, the flint and crown materials having a difference in indices of refraction between 0.6 and 0.10 and a difference in dispersive indices in excess of 20, with the flint material having the higher refractive index.

2. As a new product, a collimator lens comprising a pair of axially symmetrical doublets of substantially equal power substantially in contact, the foremost doublet consisting of a foremost positive lens of crown material having a focal length of from one to two times the focal length of the collimator and a negative lens of flint material having a focal length of from 1.5 to 3.5 times the focal length of the collimator, the second doublet consisting of a foremost positive lens of crown material having a focal length of from 0.5 to 1.2 times the focal length of the collimator and a negative lens of flint material having a focal length of from 0.75 to 1.5 times the focal length of the collimator, said doublet nearest the focal plane of the collimator having the surface of its flint lens which faces said focal plane concave, the flint and crown materials comprising transparent organic resins having differences in indices of refraction between 0.6 and 0.10 and a difference in dispersive indices in excess of 20, with the flint material having the higher refractive index.

3. As a new product, a collimator lens comprising a pair of axially symmetrical doublets of substantially equal power substantially in contact, each of said doublets consisting of a positive lens of cyclohexyl methacrylate and a negative lens of styrene with the lens formed of cyclohexyl methacrylate foremost, the doublet nearest the focal plane of the collimator having its lens of styrene provided with a concave surface which faces said focal plane, the focal length of the cyclohexyl methacrylate lens and the styrene lens of the foremost doublet ranging respectively from one to two times the focal length of the collimator and from 1.5 to 3.5 times the focal length of the collimator and the focal length of the cyclohexyl methacrylate lens and the styrene lens of the second doublet ranging respectively from 0.5 to 1.2 times the focal length of the collimator and from 0.75 to 1.5 times the focal length of the collimator.

4. A lens system of the character described comprising a pair of axially symmetrical doublets of substantially equal power substantially in contact, the first doublet being substantially equiconvex and consisting of a foremost positive lens of crown material having a focal length of from one to two times the focal length of the collimator and a negative lens of flint material having a focal length of from 1.5 to 3.5 times the focal length of the collimator, the second doublet consisting of a foremost positive lens of crown material having a focal length of from 0.5 to 1.2 times the focal length of the collimator and a substantially equi-concave negative lens of flint material having a focal length of from 0.75 to 1.5 times the focal length of the collimator, the flint and crown materials having a difference in indices of refraction between 0.6 and 0.10 and a difference in dispersive indices in excess of 20, with the flint material having the higher refractive index.

5. A lens system of the character described comprising four axial components which constitute two doublets in contact and having substantially the numerical data set forth in the following table wherein I, II, III, and IV designate the successive lens elements $R_1$ to $R_6$ designate the radii of the surfaces thereof, $t_1$, $t_2$, $t_4$, and $t_5$ designate the thicknesses thereof, $d_6$ designates the distance between the focal surface and the adjacent lens surface, the column $N_D$ designates the indices of refraction of the components, and the column V designates the nu values of the components:

| Lens | Radius | Thickness | $N_D$ | V |
| --- | --- | --- | --- | --- |
| I | $R_1=+272.38$<br>$R_2=-111.82$ | $t_1=23.89$ | 1.506 | 57 |
| II | $R_2=-111.82$<br>$R_3=-261.17$ | $t_2=7.28$ | 1.591 | 31 |
| III | $R_4=+72.79$<br>$R_5=-165.68$ | $t_4=30.07$ | 1.506 | 57 |
| IV | $R_5=-165.68$<br>$R_6=+160.32$ | $t_5=10.26$<br>$d_6=100.06$ | 1.591 | 31 |

DAVID S. GREY.